(12) United States Patent
Li et al.

(10) Patent No.: US 10,938,078 B2
(45) Date of Patent: Mar. 2, 2021

(54) HOUSING USED FOR BATTERY PACK AND BATTERY PACK

(71) Applicant: CONTEMPORARY AMPEREX TECHNOLOGY CO., LIMITED, Ningde (CN)

(72) Inventors: Jianwei Li, Ningde (CN); Zhiqin Weng, Ningde (CN); Shengshen Ruan, Ningde (CN); Linggang Zhou, Ningde (CN); Libing Chan, Ningde (CN); Peng Wang, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 86 days.

(21) Appl. No.: 16/390,935

(22) Filed: Apr. 22, 2019

(65) Prior Publication Data

US 2019/0334139 A1     Oct. 31, 2019

(30) Foreign Application Priority Data

Apr. 28, 2018   (CN) .......................... 201820636787.4

(51) Int. Cl.
*H01M 2/10* (2006.01)
*H01M 50/20* (2021.01)
(Continued)

(52) U.S. Cl.
CPC ........... *H01M 50/20* (2021.01); *H01M 10/42* (2013.01); *H01R 11/281* (2013.01);
(Continued)

(58) Field of Classification Search
CPC ......... H01M 10/42; H01M 2010/4271; H01M 2200/103; H01M 2/1022; H01M 2/1055;
(Continued)

(56) References Cited

U.S. PATENT DOCUMENTS 6,232,021 B1 * 5/2001 Negoro ............. H01M 10/0525
429/231.1
9,496,530 B2 * 11/2016 Heidenbauer ....... H01M 10/625
(Continued)

FOREIGN PATENT DOCUMENTS

| CN | 205692891 U | * 11/2016 | .............. H01M 2/10 |
|---|---|---|---|
| CN | 106941137 A | 7/2017 | |
| JP | 2009205980 A | 9/2009 | |

OTHER PUBLICATIONS

Machine Translation CN205692891(U) (Year: 2016).*
(Continued)

*Primary Examiner* — Victoria H Lynch
(74) *Attorney, Agent, or Firm* — Brooks Kushman P.C.

(57) ABSTRACT

The present disclosure relates to the field of energy storage devices and in particular, to a housing used for a battery pack and a battery pack. The housing includes a main body and an installation panel. The main body includes a battery accommodation space and a panel installation window communicating with the battery accommodation space, and the battery accommodation space is configured to accommodate a battery. The installation panel and the main body are separately formed, and the installation panel is installed at the panel installation window. The installation panel includes a base and a connection device installation portion connected to the base, and the connection device installation portion is where a connection device that is connected to the battery is to be installed. The housing provided by the present disclosure has a relatively low production cost and a relatively high production efficiency.

11 Claims, 4 Drawing Sheets

(51) Int. Cl.
*H01M 10/42* (2006.01)
*H01R 11/28* (2006.01)
*H02J 7/00* (2006.01)

(52) U.S. Cl.
CPC .......... *H02J 7/0029* (2013.01); *H02J 7/0045* (2013.01); *H01M 2010/4271* (2013.01); *H01M 2200/103* (2013.01)

(58) Field of Classification Search
CPC ............. H01M 2/1066; H01M 2/1072; H01M 2/1077; H01M 2/1083; H01R 11/281; H02J 7/0029; H02J 7/0045
See application file for complete search history.

(56) References Cited

U.S. PATENT DOCUMENTS

| | | | |
|---|---|---|---|
| 2003/0134187 A1* | 7/2003 | Wheeler | H01M 6/44 429/97 |
| 2014/0011058 A1 | 1/2014 | Adachi et al. | |
| 2016/0043357 A1* | 2/2016 | Aida | H01M 2/1066 429/7 |

OTHER PUBLICATIONS

European Patent Office, Extended European Search Report for corresponding European patent application No. 19169468.6, dated Sep. 6, 2019.

* cited by examiner

HOUSING USED FOR BATTERY PACK AND BATTERY PACK

CROSS-REFERENCE TO RELATED APPLICATIONS

This application claims foreign priority benefits under 35 U.S.C. § 119(a)-(d) to Chinese Patent Application No. 201820636787.4, filed Apr. 28, 2018, which is incorporated by reference herein in its entirety.

TECHNICAL FIELD

The present disclosure relates to the field of energy storage devices, and in particular, to a housing used for a battery pack and a battery pack.

BACKGROUND

With the implementation of the concept of sustainable development, the development of rechargeable batteries is getting faster and faster, and the user's requirements for various performances of a battery pack are getting higher and higher. Usually, a plurality of batteries is placed in the battery pack, and a high-voltage connection device, a low-voltage connection device and a safety device are mounted on the housing. Currently, the battery pack is mostly formed by plastic injection molding. Since different battery packs have different sizes, and different battery packs have different requirements on the type and mourning position of the high-voltage connection device, the low-voltage connection device and the safety device, etc., it is necessary to provide a mold separately for a different housing, so as to form housings that meet different requirements in use. This processing method is extremely wasteful of resources, resulting in an increase in production cost and a decrease in production efficiency, and thus it does not accord with the production concept of reducing costs and increasing efficiency.

SUMMARY

The present disclosure provides a housing of a battery pack and a battery pack, so as to solve the problem of high cost and low efficiency existing in the current housing manufacturing process.

In an aspect, the present disclosure provides a housing of a battery pack, including a main body and an installation panel. The main body comprises a battery accommodation space and a panel installation window communicating with the battery accommodation space, and the battery accommodation space is configured to accommodate a battery; the installation panel and the main body are separately formed, the installation panel is installed at the panel installation window, the installation panel comprises a base and a connection device installation portion connected to the base, and the connection device installation portion is where a connection device that is connected to the battery is to be installed.

Optionally, the connection device installation portion comprises a high-voltage installation portion and a low-voltage installation portion, the high-voltage installation portion comprises a positive installation portion and a negative installation portion, and the low-voltage installation portion is disposed between the positive installation portion and the negative installation portion in a length direction of the installation panel.

Optionally, the negative installation portion comprises a negative output installation portion where overall output negative terminal of the battery pack is to be installed, the positive installation portion comprises a safety device installation portion where a safety device of the battery pack is to be installed and a positive output installation portion where an overall output positive terminal of the battery pack is to be installed, and the safety device installation portion is disposed between the positive output installation portion and the negative output installation portion in the length direction.

Optionally, the safety device installation portion comprises a maintenance switch installation portion where a maintenance switch of the battery pack is to be installed and a fuse installation portion where a fuse of the battery pack is to be installed, and the fuse installation portion is disposed between the maintenance switch installation portion and the positive output installation portion in the length direction.

Optionally, the installation panel further comprises a connection device protection cover, and the connection device protection cover is connected to the base and covers the connection device installation portion.

Optionally, the installation panel further comprises a heating connection device pedestal installation portion, in which a pedestal of a connection device connected to a heating component in the housing is to be installed.

Optionally, the installation panel is connected to the main body by a threaded connector.

Optionally, the base has a clamping protrusion by which a position-limiting matching is formed between the installation panel and the main body.

Optionally, the housing further includes a sealing ring, and the sealing ring is disposed between the installation panel and the main body.

In another aspect, the present disclosure provides a battery pack, including: a battery, a connection device, and the housing described above. The battery is accommodated in the battery accommodation space of the housing, the connection device is installed at the installation panel of the housing, and the connection device is electrically connected to the battery.

The technical solutions provided by the present disclosure can at least achieve the following beneficial effects.

The housing provided by the present disclosure includes a main body and an installation panel that are separately formed. The installation panel is installed at the panel installation window of the main body. The installation panel is provided with a connection device installation portion that is connected to the battery. In the process of manufacturing the housing, the worker can design and shape the main body with a size corresponding to the type of the required battery pack. Each main body can be provided with a panel installation window having a same size, so as to install the installation panel processed by mass production. In this way, the production cost can be greatly reduced, and the production efficiency is correspondingly increased.

It should be noted that the above general description and the following detailed description are merely illustrative and are not intended to limit the present disclosure.

REFERENCE SIGNS

- 1—main body;
- 2—installation panel;
- 21—base;
- 211—clamping protrusion;
- 22—high-voltage installation portion;
- 221—positive output installation portion;
- 222—negative output installation portion;
- 223—maintenance switch installation portion;
- 224—fuse installation portion;
- 23—low-voltage installation portion;
- 24—heating connection device pedestal installation portion;
- 241—interlocking pin;
- 242—guiding pillar;
- 243—key slot;
- 25—connection device protection cover;
- 251—balance valve;
- 252—shielding layer;
- 26—nut;
- 27—bolt;
- 3—sealing ring;
- 41—high-voltage connection device;
- 411—high-voltage wire;
- 412—terminal;
- 42—low-voltage connection device;
- 43—maintenance switch;
- 431—handle;
- 432—weight reduction notch;
- 44—fuse;
- 45—heating, connection device pedestal;
- 451—interlocking terminal;
- 452—guiding slot;
- 453—key pillar;
- 454—inspection hole.

The drawings herein are incorporated into and constitute a part of the present specification, which show the embodiments of the present disclosure and illustrate the principles of the present disclosure together with the specification.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The present disclosure will be further described in detail below through the embodiments and the accompanying drawings.

As shown in FIGS. 1-10, embodiments of the present disclosure provide a housing of a battery pack and a battery pack. The housing is used for accommodating a battery (not shown in the figure), so as to form a battery pack. This housing has a low production cost and a high production efficiency. The housing includes a main body 1 and an installation panel 2. The main body 1 includes a battery accommodation space and a panel installation window (not shown in the figure). The battery accommodation space communicates with the panel installation window. In the process of assembling the battery pack, the battery is installed in the battery accommodation space. A size of the main body 1, a shape and a size of the battery accommodation space can be determined according to actual needs, so as to accommodate the battery in different quantities and/or of different sizes. In addition, as for housings having different sizes and shapes, panel installation windows having a same shape and a same size are provided for installing installation panels 2 processed by mass production. The installation panel 2 includes a base 21 and a connection device installation portion connected to the base 21. In the process of assembling the battery pack, a connection device can be installed in the connection device installation portion, and the connection device can be connected to the battery in the housing. The type and installation position of the connection device can be determined according to actual needs. Correspondingly, the connection device installation portion may be divided into regions for installing different connection devices, which is not limited herein. Specifically, the main body 1 can be formed by plastic injection molding, which can reduce an overall weight of the battery pack to a certain extent. The base 21 of the installation panel 2 can be formed using a metal material by die casting. The connection device installation portion can be an installation hole, an installation pedestal or the like. The connection device installation portion and the base 21 may be formed by integral molding. In addition, the main body 1 may also be formed by a metal material, which not only improves the structural strength of the entire housing, but also prevents electromagnetic induction caused by components such as a high-voltage connection device in the battery pack from interfering with other components in automobiles or battery systems. In the process of manufacturing the housing, the main body 1 and the installation panel 2 can be formed in advance, and then the installation panel 2 is installed at the panel installation window of the main body 1 by welding, clamping or bonding, or by means of a screw connector or a rivet, so as to form a complete housing.

As can be seen from the above, the housing provided by the present disclosure includes a main body 1 and an installation panel 2 that are separately formed. The installation panel 2 is installed at the panel installation window of the main body 1. The installation panel 2 is provided with a connection device installation portion connected to the battery. In the process of manufacturing the housing, the worker can design and shape the main body 1 with a corresponding size to the type of the required battery pack. Each main body 1 can be provided with a panel installation window having a same size, so as to install the installation panel 2 processed by mass production. In this way, the production cost can be greatly reduced, and the production efficiency is correspondingly increased.

In order to facilitate detecting and monitoring a working state of the battery pack, a low-voltage connection device 42 is usually arranged in the battery pack to detect parameters such as working voltage and temperature of the battery in the housing. Further, the connection device installation portion of the installation panel 2 includes a high-voltage installation portion 22 and a low-voltage installation portion 23. The high-voltage installation portion 22 includes a positive installation portion and a negative installation portion. The battery pack has an overall output positive terminal mounted at the positive installation portion, and an overall output negative terminal mounted at the negative installation portion. The low-voltage connection device 42 can be installed at the low-voltage installation portion 23. When forming the high-voltage installation portion 22 and the low-voltage installation portion 23, the low-voltage installation portion 23 can be disposed between the positive installation portion and the negative installation portion in a length direction of the installation panel 2, so that a distance between the overall output positive terminal and the overall output negative terminal of the battery pack is as large as possible to improve the safety performance of the battery pack. It should be noted that the length direction of the installation panel 2 is a direction X in FIG. 2.

For further improving the safety performance of the battery pack and for specific design requirements of the battery pack, further, the negative installation portion includes a negative output installation portion 222 where an overall output negative terminal of the battery pack is to be installed. The positive installation portion may include a safety device installation portion and a positive output installation portion 221. The safety device installation portion may be arranged between the positive output installation portion 221 and the negative output installation portion 222 in the abovementioned length direction. In the process of assembling the battery pack, the overall output positive terminal of the battery pack can be installed on the positive output installation portion 221, and the safety device can be installed in the safety device installation portion. Herein, the safety device may be a fuse, a safeguard, a safety assembly, or the like. The safety device is electrically connected to the overall output positive terminal, so that the safety device can be used to protect the user's life and property when the battery pack breaks down or is damaged.

For facilitating overhaul and maintenance of the battery pack, preferably, the safety device installation portion may include a maintenance switch installation portion 223 and a fuse installation portion 224. The fuse installation portion 224 may be arranged between the maintenance switch installation portion 223 and the positive output installation portion 221 in the abovementioned length direction, and therefore, when the maintenance switch 43 is switched off, the fuse 44 can be prevented from being fused due to an unexpected situation. Specifically, the maintenance switch 43 can be a manual maintenance switch 43, and the manual maintenance switch 43 includes a handle 431. Connection and disconnection between the battery in the battery pack and the overall output positive terminal can be controlled by adjusting a position of the handle 431. It should be noted that the maintenance switch 43 may be otherwise a switch with another structure or another type. The maintenance switch 43 can be installed at the maintenance switch installation portion 223. The fuse 44 can be a fuse. The fuse 44 can be installed at the fuse installation portion 224, two ends of the fuse can be respectively connected to the maintenance switch 43 and the overall output positive terminal of the battery pack, so as to ensure sale working of the battery pack. In addition, in order to minimize the overall weight of the battery pack, the maintenance switch 43 can be provided with a weight reduction notch 432.

Figure 4:
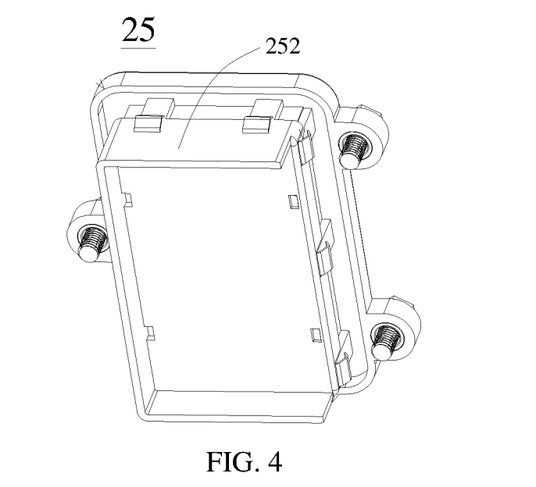
FIG. 4 is a schematic structural diagram illustrating a connection device protection cover in a housing according to an embodiment of the present disclosure.

For ensuring the safety of the connection device installed in the housing, as shown in FIG. 4, the installation panel 2 can be further provided with a connection device protection cover 25. The connection device protection cover 25 and the base 21 may be integrally formed to form a connection device protection cover 25 directly connected to the base 21. Or the connection device protection cover 25 and the base 21 are separately formed, and then the connection device protection cover 25 is connected to the base 21 by means of a connector such as a screw. In this way, the connection device can be protected by the connection device protection cover 25 that covers the connection device installation portion. Or the connection device protection cover 25 itself has a buckle structure or the like, and is directly connected to the base 21 through the buckle structure or the like, so as to provide a certain protection to the connection device. More preferably, a structure such as a sealer can be added to form a sealed connection between the connection device protection cover 25 and the connection device installation portion, thereby further improving the protection effect on the connection device installed in the connection device installation portion. In addition, the installation panel 2 may be further provided with a fuse protection cover for the fuse 44, and the fuse protection cover can function similarly like the connection device protection cover 25. The fuse protection cover and the base 21 may be integrally formed so that the fuse protection cover is directly connected to the base 21, and the fuse protection cover covers the fuse installation portion 224 to protect the fuse 44. Or the fuse protection cover and the base 21 are separately formed, and then the fuse protection cover can be connected to the base 21 by a structure such as a connector or a buckle. Of course a sealer or the like may also be arranged between the fuse protection cover and the base, so as to further improve the protection effect on the fuse 44.

For achieving connection with the heating component inside the battery pack by a heating connection device pedestal 45 (i.e., a pedestal of a connection device connected to a heating component in the housing), optionally, as shown in FIGS. 2, 3, 9, and 10, the installation panel 2 can further include a heating connection device pedestal installation portion 24 that is configured to install the heating connection device pedestal 45. After the battery pack is assembled, one end of the heating connection device pedestal 45 inside the housing is connected to a heating component (not shown in the figure) in the battery pack, and another end of the heating connection device pedestal 45 outside the housing is connected to a wire harness (not shown in the figure) outside the battery pack. Specifically, in the process of forming the heating connection device pedestal installation portion 24, an interlocking, pin 241 can be provided to be connected to an interlocking terminal 451 on the heating connection device pedestal 45, thereby fixedly connecting the heating connection device pedestal 45 to the heating connection device pedestal installation portion 24. Preferably, the heating connection device pedestal installation portion 24 is further provided with a guiding pillar 242 and a key slot 243 for matching up with a guiding slot 452 and a key pillar 453 of the heating connection device pedestal 45. With the guiding pillar 242, it is convenient to install the heating connection device pedestal 45 into the heating connection device pedestal installation portion 24. With the key slot 243, reliability of the connection between the heating connection device pedestal 45 and the heating connection device pedestal installation portion 24 can be improved, and in this way, the heating connection device pedestal 45 is less prone to rotation or deviation, so that the heating connection device pedestal can work normally and safely. In order to facilitate the inspection of the working condition of the heating connection device pedestal 45, the heating connection device pedestal 45 can be further provided with an inspection hole 454, so that the worker can check the working conditions inside and outside the heating connection device pedestal 45 through the inspection hole 454.

Figure 3:
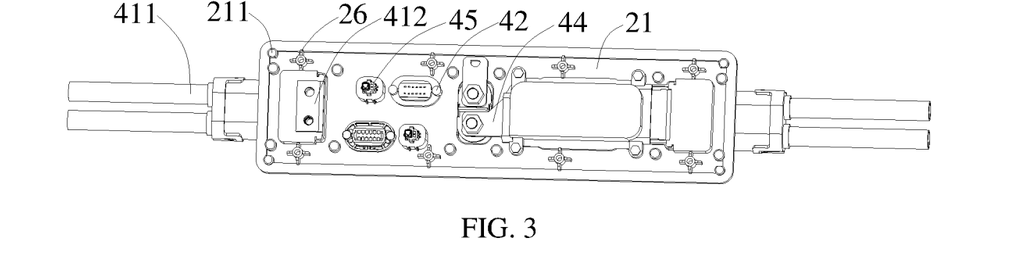
FIG. 3 is a schematic diagram illustrating an installation panel engaged with a connection device in a housing in another direction according to an embodiment of the present disclosure.
Figure 5:
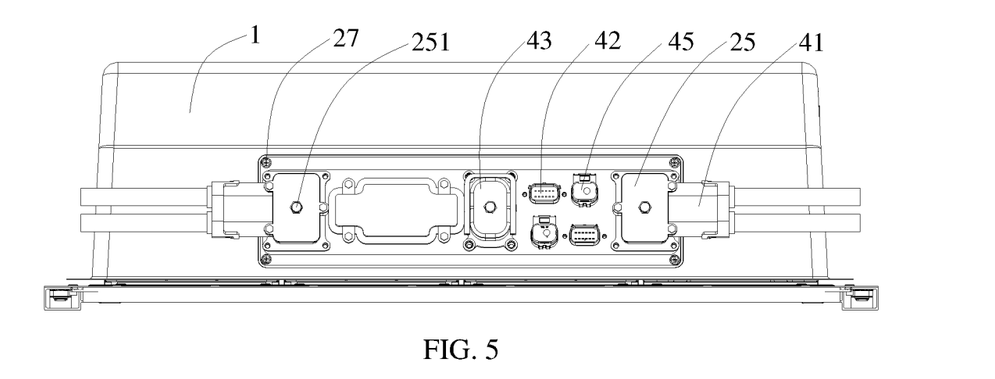
FIG. 5 is a schematic structural diagram illustrating a battery pack according to an embodiment of the present disclosure.
Figure 6:
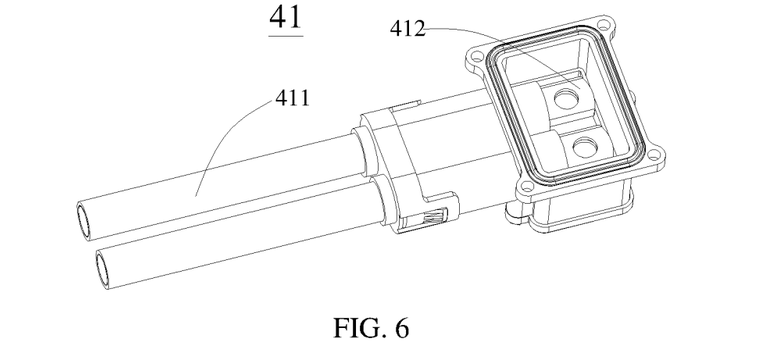
FIG. 6 is a schematic structural diagram illustrating a high-voltage connection device in a battery pack according to an embodiment of the present disclosure.
Figure 7:
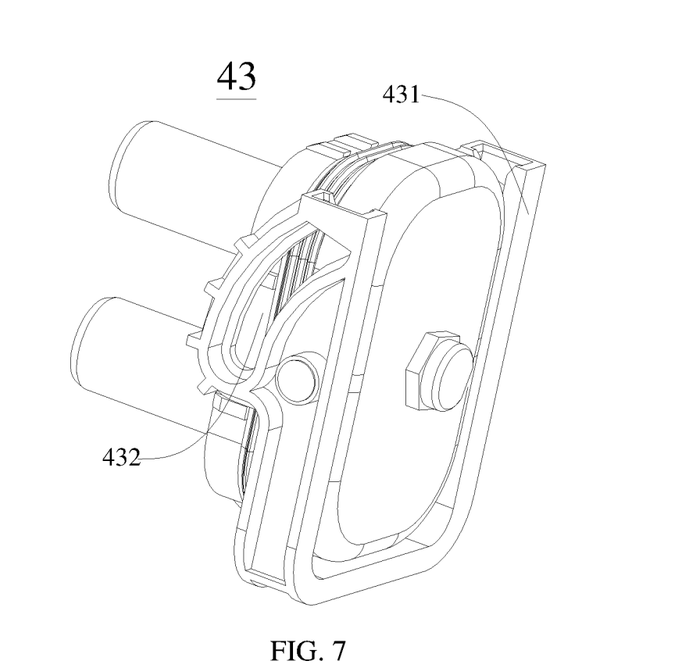
FIG. 7 is a schematic structural diagram illustrating a maintenance switch in a battery pack according to an embodiment of the present disclosure.
Figure 8:
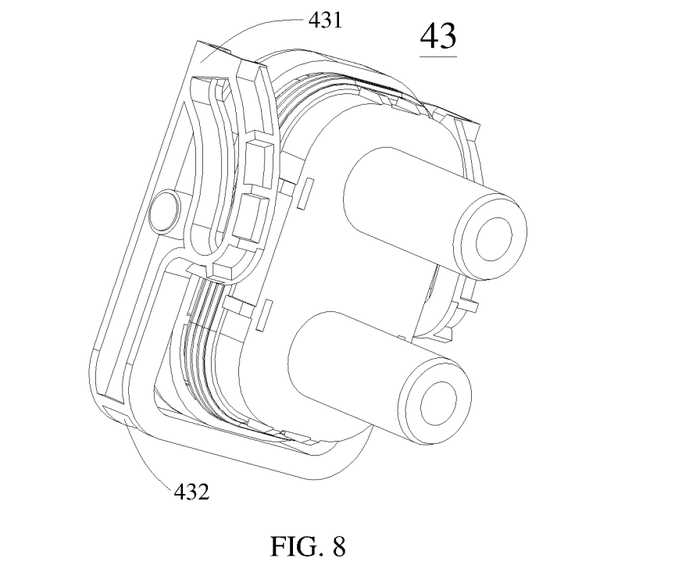
FIG. 8 is a schematic structural diagram illustrating a maintenance switch in a battery pack in another direction according to an embodiment of the present disclosure.
Figure 9:
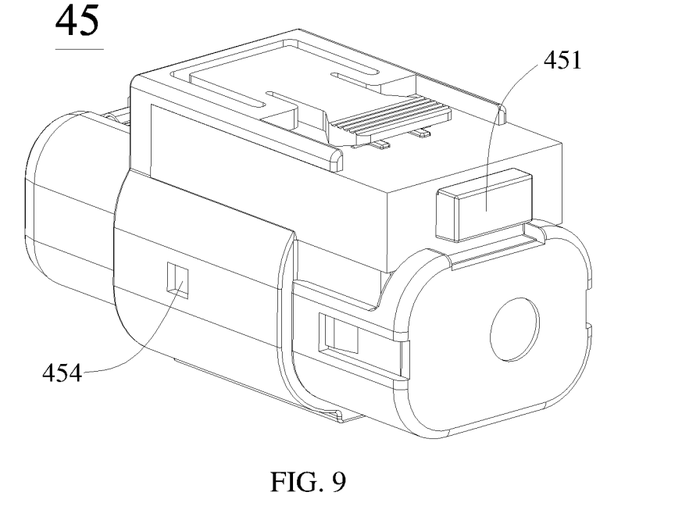
FIG. 9 is a schematic structural diagram illustrating a heating connection device in a battery pack according to an embodiment of the present disclosure.
Figure 10:
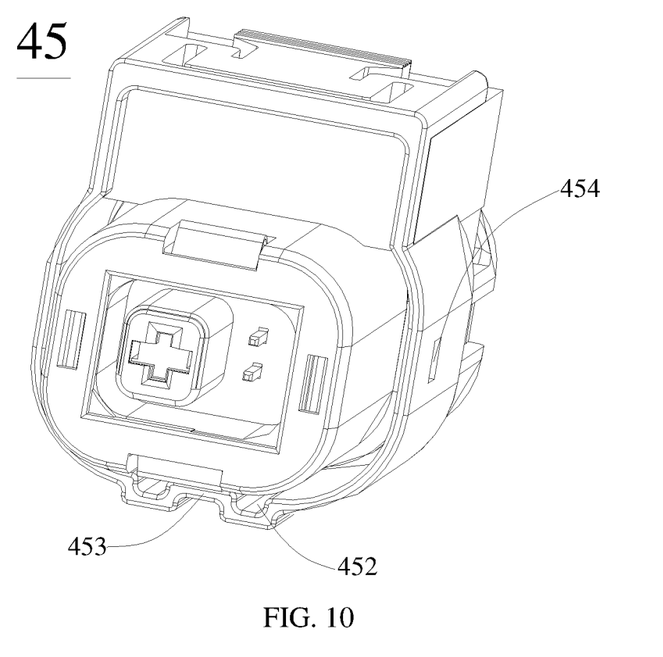
FIG. 10 is a schematic structural diagram illustrating a heating connection device in a battery pack in another direction according to an embodiment of the present disclosure.

In order to facilitate disassembly and assembly between the installation panel 2 and the main body 1, preferably, as shown in FIG. 3 and FIG. 5, the installation panel 2 and the main body 1 can be connected by a threaded connector. Specifically, in the process of forming the main body 1, a threaded hole is formed in the body 1 in advance, and then the installation panel 2 is connected to the main body 1 by a screw (not shown); or a nut 26 is integrally formed in the main body 1 or in the installation panel 2, and a through hole is formed at a position corresponding to the installation panel 2 or the main body, so that the installation panel 2 can be connected to the main body 1 through connection between a bolt 27 and the nut 26.

In order to facilitate the connection process between the installation panel 2 and the main body 1, optionally, as shown in FIG. 3, in the process of manufacturing the installation panel 2, a clamping protrusion 211 is formed on the base 21 in advance, and thus in the process of connecting the installation panel 2 to the main body 1, a predetermined position relation can be formed between the clamping protrusion 211 and the main body 1, and then the installation panel 2 is fixedly connected to the main body 1 by welding or threaded connection, etc. Meanwhile, with the clamping protrusion 211, a position-limiting matching is formed between the installation panel 2 and the main body 1, thereby reducing a load of the threaded connector or a welding spot to a certain extent, and thus improving the service life of the threaded connector and the welding spot and ensuring the reliability of the connection between the installation panel 2 and the main body 1.

Figure 1:
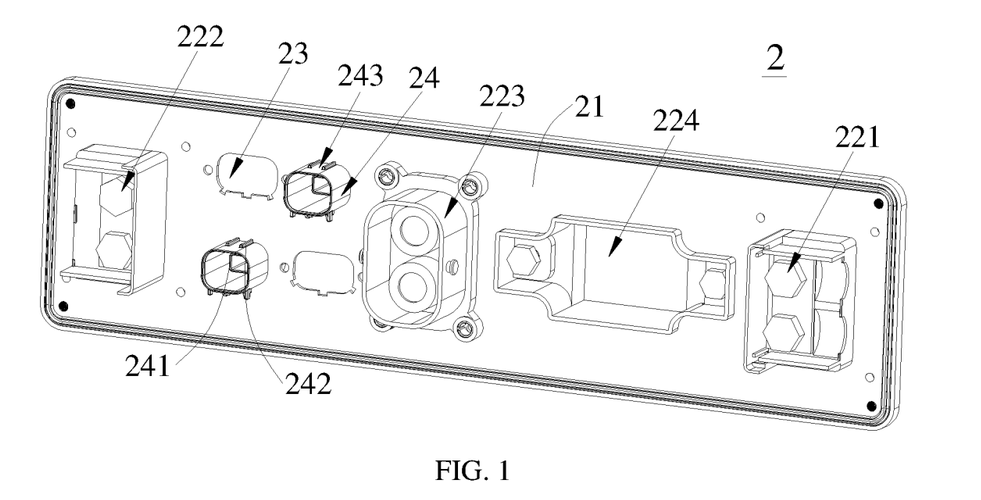
FIG. 1 is a schematic structural diagram illustrating an installation panel in a housing according to an embodiment of the present disclosure.
Figure 2:
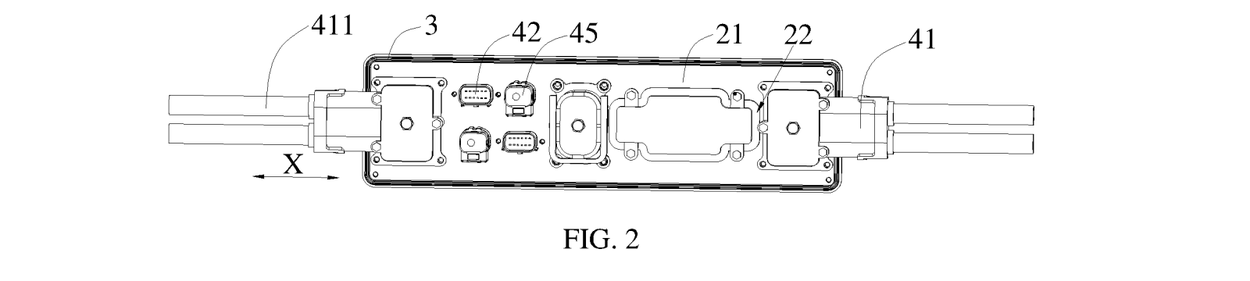
FIG. 2 is a schematic diagram illustrating an installation panel engaged with a connection device in a housing according to an embodiment of the present disclosure.

In order to ensure that a reliable sealing between the installation panel 2 and the main body 1 is formed, preferably, as shown in FIG. 1, the housing provided by the present disclosure further includes a sealing ring 3. The sealing ring 3 can be made of a material such as silicone rubber. A shape, size and thickness of the sealing ring 3 can be designed according to the shape and size of the installation panel 2. In the process of assembling the housing, the sealing ring 3 can be fixedly connected between the main body 1 and the installation panel 2, thereby further ensuring the reliability of the sealing between the installation panel 2 and the main body 1, and thus improving the overall sealing of the housing in order to avoid a sealing failure of the entire battery pack due to a difference between an internal air pressure and an external air pressure of the battery pack, optionally, a balance valve 251 can be arranged on the connection device protection cover 25, so as to balance the air pressures inside and outside the battery pack.

Based on the housing provided by any of the above embodiments, as shown in FIG. 5-10, the present disclosure further provides a battery pack that can be applied to an automobile or a battery system, etc. The battery pack includes a battery, a connection device, and a housing provided by any of the above embodiments. The battery can be installed in the battery accommodation space of the housing, the connection device is installed on the installation panel 2 of the housing, and the connection device is electrically connected to the battery. Specifically the number of the battery can be determined according to actual needs. In a housing where a plurality of batteries is provided, the plurality of batteries can be regularly arranged in the housing.

Further, as shown in FIG. 1-10, the connection device inside the battery pack can include a high-voltage connection device 41, a low-voltage connection device 42, a maintenance switch 43, a fuse 44, a heating connection device pedestal 45, etc. Herein, two high-voltage connection devices 41 may be provided. Each high-voltage connection device 41 is provided therein with a high-voltage wire 411 and a terminal 412 that are connected to each other, and the terminal 412 is connected to the battery. In this way, the two high-voltage connection devices 41 can be respectively used as the overall output positive terminal and the overall output negative terminal of the battery pack. The overall output negative terminal of the battery pack is connected to the battery in the battery pack. The battery is also connected to the maintenance switch 43. The maintenance switch 43 is connected to the fuse 44, and the fuse 44 is further connected to the overall output positive terminal. In this way, the battery pack forms a complete circuit for outputting electrical energy. In order to ensure safe and normal operation of the battery pack, the low-voltage connection device 42 is connected to the battery to detect parameters such as voltage and temperature of the battery in the battery pack, in order to ensure that the battery pack is in operation under a safe state. In addition, for a housing where the main body 1 of the housing is made of a non-metal material, a shielding layer 252 can be disposed around the high-voltage connection device 41. The shielding layer 252 can be disposed on the connection device protection cover 25, so as to avoid an electromagnetic induction phenomenon of the high-voltage connection device 41 when being energized, which may adversely affect normal operation of other components in the automobile or the battery system.

The above-described embodiments are not intended to limit the present disclosure. Various changes and modifications may be made by those skilled in the art. However, any modification, equivalent substitution or improvements made within the principle of the present disclosure shall fall into the protection scope of the present disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form timber embodiments of the disclosure.

What is claimed is:

1. A housing used for a battery pack, comprising:
   a main body, wherein the main body comprises a battery accommodation space and a panel installation window communicating with the battery accommodation space, and the battery accommodation space is configured to accommodate a battery; and
   an installation panel, wherein the installation panel and the main body are separately formed, the installation panel is installed at the panel installation window, and the installation panel comprises a base and a connection device installation portion connected to the base, and the connection device installation portion is where a connection device that is connected to the battery is to be installed,
   wherein the installation panel further comprises a heating connection device pedestal installation portion, in which a pedestal of a connection device connected to a heating component in the housing is to be installed,
   wherein the pedestal of the connection device connected to the heating component comprises a guiding slot and a key pillar, and the heating connection device pedestal installation portion is provided with a guiding pillar and a key slot for matching up with the guiding slot and the key pillar.

2. The housing according to claim 1, wherein the connection device installation portion comprises a high-voltage installation portion and a low-voltage installation portion, the high-voltage installation portion comprises a positive installation portion and a negative installation portion, and the low-voltage installation portion is disposed between the positive installation portion and the negative installation portion in a length direction of the installation panel.

3. The housing according to claim 2, wherein the negative installation portion comprises a negative output installation portion where overall output negative terminal of the battery pack is to be installed, the positive installation portion comprises a safety device installation portion where a safety device of the battery pack is to be installed and a positive output installation portion where an overall output positive terminal of the battery pack is to be installed, and the safety device installation portion is disposed between the positive output installation portion and the negative output installation portion in the length direction.

4. The housing according to claim 3, wherein the safety device installation portion comprises a maintenance switch installation portion where a maintenance switch of the battery pack is to be installed and a fuse installation portion where a fuse of the battery pack is to be installed, and the fuse installation portion is disposed between the maintenance switch installation portion and the positive output installation portion in the length direction.

5. The housing according to claim 3, wherein the installation panel further comprises a connection device protection cover, and the connection device protection cover is connected to the base and covers the connection device installation portion.

6. The housing according to claim 5, wherein the installation panel further comprises a shielding layer disposed on the connection device protection cover and to be disposed around a high-voltage connection device of the connection device, and the shielding layer is configured to avoid an electromagnetic induction phenomenon of the high-voltage connection device when being energized.

7. The housing according to claim 1, wherein the installation panel is connected to the main body by a threaded connector.

8. The housing according to claim 1, wherein the base has a clamping protrusion by which a position-limiting matching is formed between the installation panel and the main body.

9. The housing according to claim 1, further comprising a sealing ring, wherein the sealing ring is disposed between the installation panel and the main body.

10. The housing according to claim 1, wherein the heating connection device pedestal installation portion is further provided with an interlocking pin that is configured to be connected to an interlocking terminal on the pedestal of the connection device connected to the heating component.

11. A battery pack, comprising:
    a housing comprising:
       a main body, wherein the main body comprises a battery accommodation space and a panel installation window communicating with the battery accommodation space, and
       an installation panel, wherein the installation panel and the main body are separately formed, the installation panel is installed at the panel installation window, and the installation panel comprises a base, a connection device installation portion which is connected to the base, and a heating connection device pedestal installation portion in which a pedestal of a connection device connected to a heating component in the housing is installed,
       wherein the pedestal of the connection device connected to the heating component comprises a guiding slot and a key pillar, and the heating connection device pedestal installation portion is provided with a guiding pillar and a key slot for matching up with the guiding slot and the key pillar; and
    a battery accommodated in the battery accommodation space of the housing; and
    a connection device installed at the connection device installation portion of the installation panel of the housing, and electrically connected to the battery.

* * * * *